United States Patent
Swaminathan et al.

(10) Patent No.: US 8,996,568 B2
(45) Date of Patent: Mar. 31, 2015

(54) METHODS AND APPARATUS FOR EFFICIENTLY PROCESSING MULTIPLE KEYWORD QUERIES ON A DISTRIBUTED NETWORK

(75) Inventors: Ashwin Swaminathan, San Diego, CA (US); Ranjith Subramanian Jayaram, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 12/835,710

(22) Filed: Jul. 13, 2010

(65) Prior Publication Data

US 2012/0011150 A1     Jan. 12, 2012

Related U.S. Application Data

(60) Provisional application No. 61/225,505, filed on Jul. 14, 2009.

(51) Int. Cl.
*G06F 7/00* (2006.01)
*G06F 17/30* (2006.01)
*H04L 29/08* (2006.01)

(52) U.S. Cl.
CPC .... *G06F 17/30699* (2013.01); *G06F 17/30867* (2013.01); *H04L 67/16* (2013.01); *H04L 67/104* (2013.01); *H04L 67/1068* (2013.01)
USPC ....................................................... 707/770

(58) Field of Classification Search
USPC .................... 709/247; 707/742, 769
See application file for complete search history.

(56) References Cited

U.S. PATENT DOCUMENTS

| | | | | |
|---|---|---|---|---|
| 4,811,217 A | * | 3/1989 | Tokizane et al. | 707/758 |
| 4,977,499 A | * | 12/1990 | Banning et al. | 709/237 |
| 5,265,065 A | * | 11/1993 | Turtle | 1/1 |
| 6,487,606 B1 | * | 11/2002 | Minyard et al. | 709/251 |
| 7,054,867 B2 | * | 5/2006 | Bosley et al. | 1/1 |
| 7,409,406 B2 | | 8/2008 | Agrawal et al. | |
| 8,209,761 B2 | * | 6/2012 | Yao | 726/26 |
| 2003/0126122 A1 | * | 7/2003 | Bosley et al. | 707/3 |
| 2005/0108368 A1 | * | 5/2005 | Mohan et al. | 709/220 |
| 2008/0192653 A1 | * | 8/2008 | Onodera | 370/256 |
| 2008/0195597 A1 | | 8/2008 | Rosenfeld et al. | |

(Continued)

FOREIGN PATENT DOCUMENTS

| | | |
|---|---|---|
| CN | 1829998 A | 9/2006 |
| CN | 101087305 A | 12/2007 |
| TW | I250742 | 3/2006 |

OTHER PUBLICATIONS

Mutaf et al., Compact neighbor discovery (A bandwidth defense through bandwidth optimization), 2005, pp. 2711-2719.*

(Continued)

*Primary Examiner* — Jason Liao
(74) *Attorney, Agent, or Firm* — Kristine U. Ekwueme

(57) ABSTRACT

Methods and apparatus are described herein for performing AND/OR searching using multiple keywords. A query is received at a first node in a network having multiple keywords. The first node determines a set of documents matching a first of the multiple keywords, and computes an ideal Bloom filter representing those keywords. The first node sends the query and the Bloom filter to a second node, which determines its search results for a second of the multiple keywords in accordance with the Bloom filter.

34 Claims, 8 Drawing Sheets

(56) References Cited

U.S. PATENT DOCUMENTS

| | | | |
|---|---|---|---|
| 2008/0256243 | A1 | 10/2008 | White |
| 2008/0270628 | A1* | 10/2008 | Nekovee et al. ............. 709/247 |
| 2008/0313132 | A1 | 12/2008 | Hao et al. |
| 2009/0016255 | A1* | 1/2009 | Park ............................. 370/312 |
| 2010/0030840 | A1* | 2/2010 | O'Shea et al. ................ 709/201 |
| 2010/0094877 | A1* | 4/2010 | Garbe ........................... 707/742 |
| 2010/0138443 | A1* | 6/2010 | Ramakrishnan et al. ..... 707/769 |

OTHER PUBLICATIONS

Bloom, Space/time trade-offs in hash coding with allowable errors Jul. 1970, Communications of the ACM, vol. 13 Issue 7, pp. 422-426.*

Knuth, the Art of Computer Programming $2^{nd}$ ed. 1973, Addison-Wesley, vol. 1, pp. 1-9.*

Knuth, The Art of Computer Programming $2^{nd}$ ed 1998, Addison-Wesley, vol. 3, pp. 567-573.*

Mitzenmacher, Compressed bloom filters Oct. 2, IEEE/ACM Transactions on Networking (TON), vol. 10 Issue 5, pp. 604-612.*

Michael et al, Improving distributed join efficiency with extended bloom filter operations 2007, IEEE, AINA '07, pp. 187-194.*

Chen et al., "Efficient Multi-keyword Search over P2P Web", in: WWW 08: Proceeding of the 17th international conference on World Wide Web [online] 2008, pp. 989-998. [retrieved on Feb. 14, 2011] Retrieved from the internet URL: http://portal.acm.org/citation.cfm7ids1367631.

Derong et al., "An efficient multi-keyword query processing strategy on P2P based Web search", Wuhan University Journal of Natural Sciences, vol. 12, No. 5, 2007, pp. 881-886, [retrieved on Feb. 14, 2011], Retrieved from the internet URL: http://portal.acm.org/citation.cfm?id=1367631.

International Search Report and Written Opinion—PCT/US2010/42021, International Search Authority—European Patent Office—Feb. 28, 2011.

Ramesh et al., "Optimizing Distributed Joins with Bloom Filters", In: Proceedings of the 5th International Conference on Distributed Computing and Internet Technology, ICDCIT 08, New Delhi, India, 2008. [retrieved on Feb. 14, 2011] Retrieved from the internet URL: http://portal.acm.org/citation.cfm?id=1505058.

Sei Y, "Using Ringed Bloom Filter to reduce the communication traffic on a distributed Hash table." Journal (Transaction) of the Information Processing Society of Japan. The Information Processing Society of Japan, Jul. 15, 2006. vol. 48, No. 7: 2267-2277.

Shiraki T, et al., "A Bloom Filter-Based User Search Method Based on Movement Records for P2P Network," Proceedings of Multimedia, Distributed, Cooperative and Mobile (DICOMO) Symposium 2009. Series of Symposium of the Information Processing Society of Japan. vol. 2009. No. 1 [CD-ROM]. The Information Processing Society of Japan, Jul. 8, 2009. vol. 2009: 1330-1335.

Huang, C-C., Thesis, "Design and Implementation of Script Language, Compiler, and Engine for Stateful Content-Based Packet Classification", Jun. 2004.

Roozenburg, J., "A Literature Survey on Bloom Filters", Faculty of Electrical Engineering, Mathematics, and Computer Science, Delft University of Technology, pp. 1-44, Nov. 8, 2005.

Taiwan Search Report—TW099123170—TIPO—Dec. 17, 2013.

Knuth, "The Art of Computer Programming 2nd ed 1998", Addison-Wesley, vol. 3, pp. 567-573.

Mutaf P., et al. Compact Neighbor Discovery (A Bandwidth Defense Through Bandwidth Optimization), Infocom 2005. 24th Annual Joint Conference of the IEEE Computer and Communications Societies. Proceedings IEEE, Miami, FL, US, Mar. 13-17, 2005, Piscataway, NJ, USA, IEEE, vol. 4, (Mar. 13, 2005) pp. 2711-2719.

Ramesh, et al., "Optimizing Distributed Joins with Bloom Filters", In: Proceedings of the 5th International Conference on Distributed Computing and Internet Technology, ICDCIT 08, New Delhi, India, 2008. [retrieved on Feb. 14, 2011] Retrieved from the internet URL: http://portal.acm.org/citation.cfm"id=1505058.

Sei Y, "Using Ringed Bloom Filter to reduce the communication traffic on a distributed Hash table." Journal (Transaction) of the Information Processing Society of Japan. The Information Processing Society of Japan, Jul. 15, 2006, vol. 48, No. 7: 2267-2277.

Toru Shiraki et al., "A Bloom Filter-Based User Search Method Based on Movement Records for P2P Network", 2009 Ninth Annual International Symposium on Applications and the Internet, pp. 177-180, IEEE computer society.

Chen, at al., "Efficient Multi-keyword Search over P2P Web", WWW 08: Procedings of the 17th international conference on World Wide Web [online] 2008, pp. 989-998.

Derong, et al., "An efficient multi-keyword query processing strategy on P2P based Web search", Wuhan University Journal of Natural Sciences, vol. 12, No. 5, 2007, pp. 881-886.

International Search Report and Written Opinion, PCT/US2010/42021, International Search Authority, European Patent Office—Feb. 28, 2011.

* cited by examiner

METHODS AND APPARATUS FOR EFFICIENTLY PROCESSING MULTIPLE KEYWORD QUERIES ON A DISTRIBUTED NETWORK

CLAIM OF PRIORITY UNDER 35 U.S.C. §119

The present Application for Patent claims priority to Provisional Application No. 61/225,505 entitled "Methods and Apparatus for Performing Searches in a Peer-to-Peer Distributed Network" filed Jul. 14, 2009 assigned to the assignee hereof and hereby expressly incorporated by reference herein.

BACKGROUND

1. Field

The present disclosure relates to a mobile operating environment, and more particularly, to distributed networks and methods and apparatus for multiple keyword queries, such as AND and OR queries, on a distributed network.

2. Background

An overlay network is a virtual network of nodes and logical links that is built on top of an existing network. Examples of an overlay network include, but are not limited to, the Internet, Chord, Content Addressable Network (CAN), Pastry, and Viceroy. In some overlay networks, each node can store a portion of overlay network data, called a partition, so as to distribute the data across the network to increase network efficiency in storage and retrieval of the data.

A device or node that joins an overlay network may desire to obtain a service from another device or node in the overlay network. Such services are published in the overlay network using any one of a plurality of service description languages, each having a corresponding service discovery protocol for use to find the published service. A definition of service discovery as given by Wikipedia states: "[s]ervice discovery protocols are network protocols which allow automatic detection of devices and services offered by these devices on a computer network." In other words, service discovery is the action of finding a service provider for a requested service. When the location of the demanded service (typically the address of the service provider) is retrieved, the user may further access and use it.

In general, service discovery protocols include two entities: (a) the service provider—who provides the service on the overlay, and (b) the client—who uses the service. In one aspect, examples of a service provider include nodes which provide services such as printing, scanning, faxing, storage, music share, file share, games, and web services such as for booking movie tickets, hotels, air tickets, or online gaming, etc. Further, any node in the network can act as a client. Thus, the goal of service discovery is to help the client find a service provider for a particular service of interest (if such a service exists).

For service discovery to be successful in a peer-to-peer overlay network, the service provider should specify its service(s) using a service description language, metadata about the service should be stored in some searchable form on nodes in the overlay, and clients should be able to express the service requests using searchable keywords that are passed on to the querying system to help find the corresponding services.

As part of the publication process, keywords are extracted from the service description document and separately published in a distributed manner over the distributed network. Queries can then be issued by individual nodes to discover keywords and/or services. Typically, performing a search for two or more keywords involves conducting an AND search wherein a query is sent to each node including one of the keywords. Similarly, an OR search is performed by sending a query to each node that includes one or more of the multiple keywords forming the query. Such typical searches are associated with a high communication cost.

Thus, it would be desirable to have a method of handling multiple keyword queries more efficiently and with an optimized communication cost.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, a method of searching in an overlay network, comprises receiving a query at a first node in an distributed network, wherein the query includes a first keyword and a second keyword; finding a first set of a first number of documents that contain the first keyword; computing an optimal first Bloom filter length and a corresponding first number of hash functions as a function of the first number of documents in the first set; and sending a first Bloom filter of the first set to a second node in the distributed network identified by hashing the second keyword, wherein the first Bloom filter comprises the first Bloom filter length and the first number of hash functions.

Yet another aspect relates at least one processor configured to publish or discover services in a network, comprising a first module for receiving a query at a first node in an distributed network, wherein the query includes a first keyword and a second keyword; a second module for finding a first set of a first number of documents that contain the first keyword; a third module for computing an optimal first Bloom filter length and a corresponding first number of hash functions as a function of the first number of documents in the first set; and a fourth module for sending a first Bloom filter of the first set to a second node in the distributed network identified by hashing the second keyword, wherein the first Bloom filter comprises the first Bloom filter length and the first number of hash functions.

Still another aspect relates to a computer program product, comprising: a computer-readable medium comprising: a first set of codes for causing a computer to receive a query at a first node in an distributed network, wherein the query includes a first keyword and a second keyword; a second set of codes for causing the computer to find a first set of a first number of documents that contain the first keyword; a third set of codes for causing the computer to compute an optimal first Bloom filter length and a corresponding first number of hash functions as a function of the first number of documents in the first set; and a fourth set of codes for causing the computer to send a first Bloom filter of the first set to a second node in the distributed network identified by hashing the second keyword, wherein the first Bloom filter comprises the first Bloom filter length and the first number of hash functions.

Yet another aspect relates to an apparatus, comprising means for receiving a query at a first node in an distributed network, wherein the query includes a first keyword and a second keyword; means for finding a first set of a first number of documents that contain the first keyword; means for computing an optimal first Bloom filter length and a corresponding first number of hash functions as a function of the first number of documents in the first set; and means for sending a first Bloom filter of the first set to a second node in the distributed network identified by hashing the second keyword, wherein the first Bloom filter comprises the first Bloom filter length and the first number of hash functions.

Another aspect relates to an apparatus for performing multiple keyword searches in a distributed network, comprising: a receiver configured to query including a first keyword and a second keyword; a keyword set determination component configured to find a first set of a first number of documents that contain the first keyword; and a Bloom filter calculation component configured to compute an optimal first Bloom filter length and corresponding first number of hash functions as a function of the first number of documents in the first set, and to send a first Bloom filter of the first set to a second node in the distributed network identified by hashing the second keyword, wherein the first Bloom filter comprises the first Bloom filter length and the first number of hash functions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Distributed networks, such as peer-to-peer networks rely on the ability to discover devices and services offered by those devices on a computer network. Various service description language schemas may be used to describe a service. The systems and methods described herein provide systems and methods for searching for documents that are published to a distributed network. In particular, the described systems and methods include finding the optimal parameters (size and number of hash functions) of the Bloom filter both for AND and OR searches.

Figure 1:
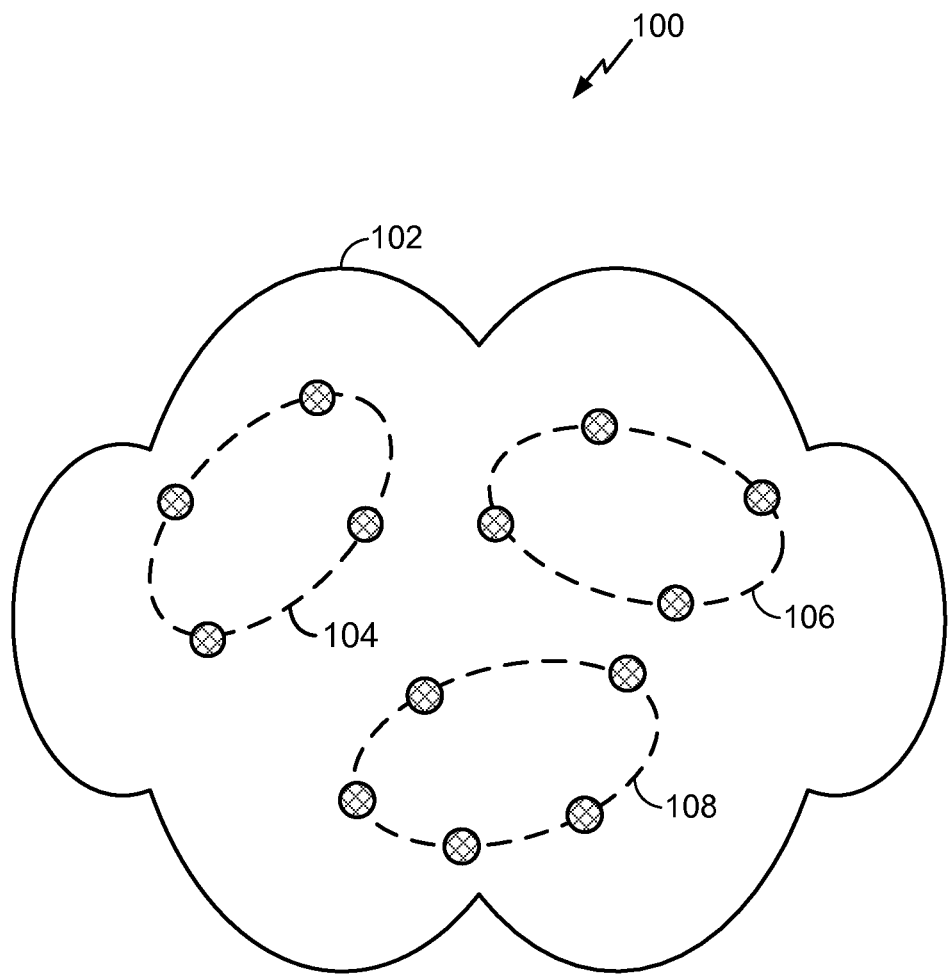
FIG. 1 is a block diagram of an aspect of a peer-to-peer network.

With reference to FIG. 1, a block diagram of a peer-to-peer overlay network 100 is provided. The network 100 comprises an underlying network 102 that comprises any type of network, such as an Internet Protocol network. Although the underlying network 102 is shown as a single entity, the underlying network may comprise any number or types of networks such as WANs, LANs, wireless networks, or any other type of network. While FIG. 1 depicts a peer-to-peer overlay network, the present application is not limited to overlay networks. Peer-to-peer overlay network 100 is one exemplary type of distributed network that may be used to implement the methods and apparatus described herein. Other types of distributed networks may also be employed. Moreover, the systems and methods described herein are equally applicable to any other type of network, including a centralized network. For example, the network 100 may include a server that provides discovery services. In such a case, the server may act as a directory that hosts information relevant for discovery. For example, the server may host keywords and corresponding information that are published by the nodes in the network. The nodes may publish the information to the server, and queries may also be sent to the server.

In an aspect, the underlying network 102 comprises multiple peer-to-peer networks (104, 106, and 108). The peer-to-peer networks 104, 106, and 108 each comprise a subset of nodes of the underlying network 102, and operate utilizing the services of the underlying network 102 to allow those nodes to communicate. For example, in the peer-to-peer networks 104, 106, and 108, the nodes are connected by communication links provided by the underlying network 102 to form desired routing paths. The peer-to-peer networks 104, 106, and 108 may have any topology or architecture to enable any routing configuration, and are not limited to the configurations shown in FIG. 1.

Within a peer-to-peer overlay network, such as networks 104, 106, and 108, each node can operate as a service provider and/or as a client. That is, the node may provide services to the overlay, and may use services of one or more other nodes. Such services may include, for example, printing, scanning, faxing, storage, music share, file share, games, and web services such as booking movie tickets, hotels, air tickets, or online gaming. It is noted, however, that these examples of services are non-limiting, and the actual services may include more or less services than those listed. Each node may comprise a computing device such as, for example, a personal computer, a laptop computer, a wireless communications device, a mobile telephone, a personal digital assistant, a printer, a fax machine, and/or any other network-connectable computing device.

A service discovery protocol may be used to assist a node acting as a client in finding a service provider for a particular service of interest. A service provider specifies its services using a service description language such as, for example, eXtensible Markup Language (XML), Research Description Format (RDF), RDF-S, Web Service Description Language (WSDL), WSDL-S, Ontology Web Language (OWL), Ontology Web Language for Services (OWL-S), Universal Description Discovery and Integration (UDDI), Universal Plug and Play (UPnP), and/or other service description languages. Metadata about the services may be stored in a searchable format on the nodes in the overlay, and clients may express a service request using searchable keywords that are passed on to a querying system to help find the corresponding services.

Metadata about the services can be stored directly in its native service description format or may be converted to a searchable schema. One possible implementation might simply extract the keywords from the service description and publish them on the overlay. Another implementation may directly publish the keywords in the chosen service description format. A third implementation might convert the service description into a searchable schema.

Figure 2:
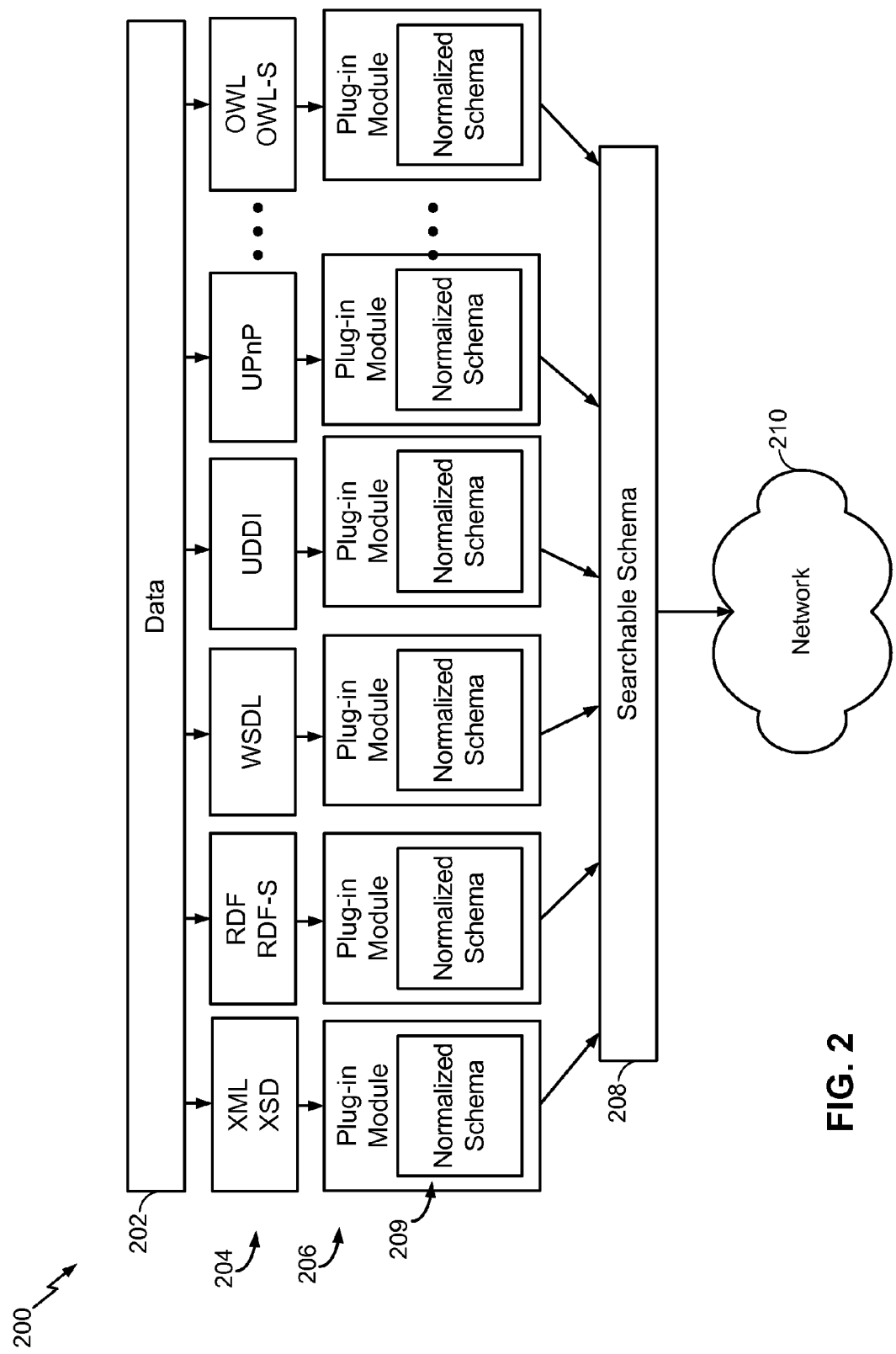
FIG. 2 is a schematic diagram of an aspect of a system for service publication, which supports the various different service description languages, in a network.

FIG. 2 depicts an exemplary system 200 for service publication, which supports the various different service description languages and the described aspects can be extended to other similar such systems. System 200 provides a common framework for services to advertise and be discovered on a peer-to-peer network. As shown in FIG. 2, data 202 for a service description may be published using any service description language/schema 204 such as, for example, XML, XDS, RDF, RDF-S, WSDL, UDDI, UPnP, OWL, OWL-s, etc. One or more plug-in modules 206 may be provided to convert a service description from its native form, e.g. in a respective service description language 204, to a searchable service description 208 based on a normalized schema 209. The searchable service description 208 may then be published on the overlay network 210.

The searchable service description 208 enables aggregation of all of the information required for service discovery, and the information required to rank-order and access services. Publishing the searchable service description 208 may include extracting keywords from the native service description. Keywords may be extracted, for example, as XML attribute-value pairs, as RDF triples, as simple keywords, or according to any other extraction method. The plug-in module 206 provides the normalized schema 209 that defines specific fields to be extracted and a format for extracting the fields. The normalized schema 209 is not a service description language as it does not provide all of the functionalities of a service description language. Unlike the use of translators, plug-in module 206 does not translate from one service description language to one or more other service description language. Rather, plug-in module 206 facilitates the extraction of certain data from the original service description based on the normalized schema 209. For example, the fields specified by the normalized schema 209 are mapped to particular data in the native service description 204. Accordingly, it is the information that is extracted according to the normalized schema 209 that is published on the overlay network. As such, rather than having multiple versions of a service description, each in a different service description language, published on the network, a single description can be published to the network that can be searched and recognized by any node.

Alternatively, the network may decide apriori that one particular service description format is to be used and all service publications/discovery are then based on that format.

Each node in overlay network 210 may be configured to store a portion of overlay network data, called a partition, so as to distribute the data across the network to increase network efficiency in storage and retrieval of the data. A term-frequency table may be used to represent a summary of the data stored on the network, with columns representing a document and the rows representing terms in the document. The term-frequency table provides valuable information about the database and can be used for several types of search.

Distribution of data across the network may be performed using the term-frequency table in various manners. For example, a partition-by-keyword approach may be used, wherein the term-frequency table is split by rows and each row or set of rows is assigned to a particular node randomly, based on a hash function. The hash function is used to distribute ownership of keywords to different nodes. Thus, each node takes responsibility for a particular set of keywords.

Figure 3:
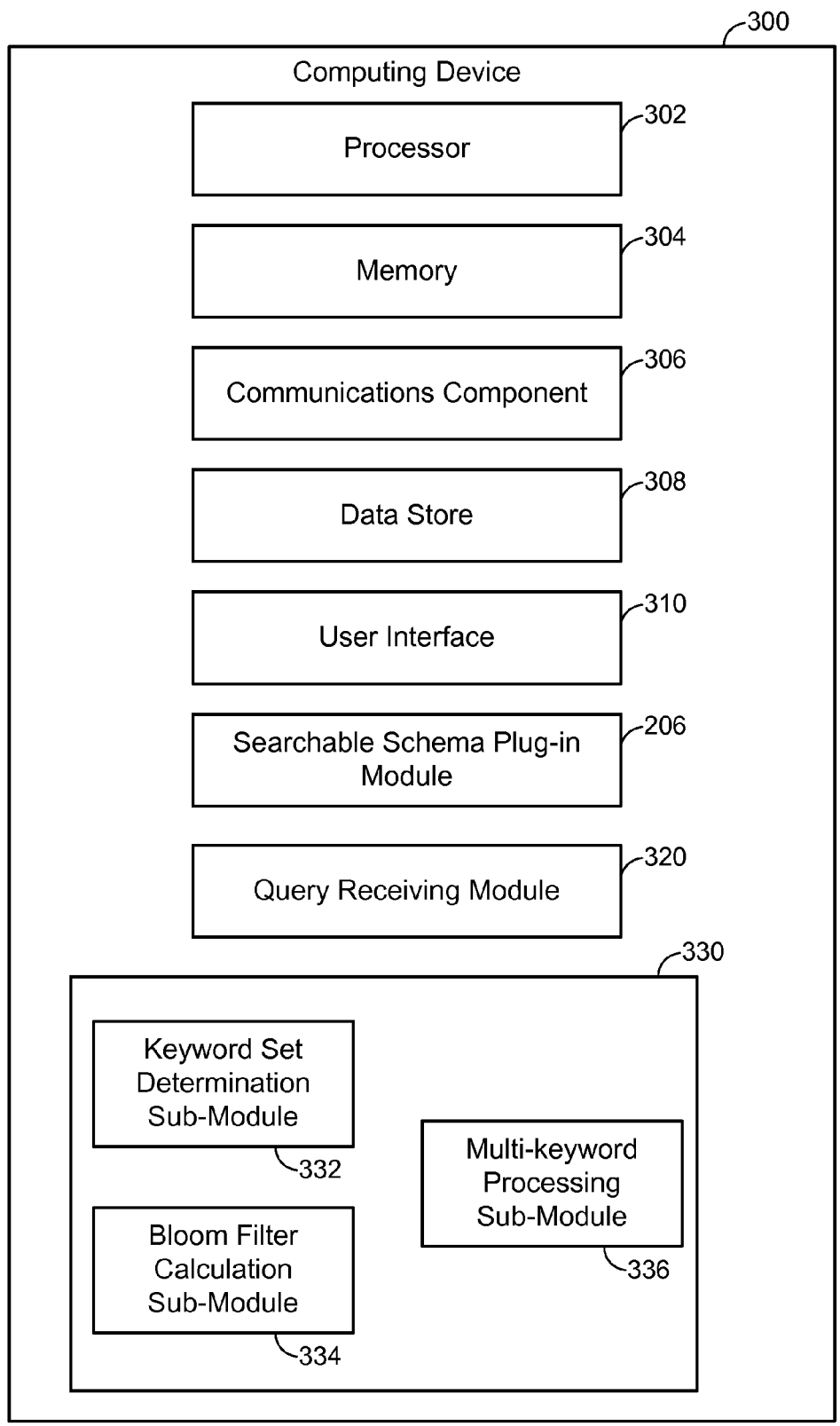
FIG. 3 is a schematic diagram of an aspect of a computing device configured to perform the functionality described.

FIG. 3 depicts an exemplary computing device 300 that may serve as a node in a distributed network. Computing device 300 includes a processor 302 for carrying out processing functions associated with one or more components and functions described herein. Processor 302 can include a single or multiple set of processors or multi-core processors. Moreover, processor 302 can be implemented as an integrated processing system and/or a distributed processing system.

Computing device 300 further includes a memory 304, such as for storing local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications component 306 that provides for establishing and maintaining communications with one or more parties utilizing hardware, software, and services as described herein. Communications component 306 may carry communications between components on computing device 300, as well as between computing device 300 and external devices, such as devices located across a communications network and/or devices serially or locally connected to computing device 300. For example, communications component 306 may include one or more buses, and may further include transmit chain components and receive chain components associated with a transmitter and receiver, respectively, operable for interfacing with external devices. Further, for example, communications component 306 may be configured to enable computing device 300 to communicate with other nodes in a distributed network.

Additionally, computing device 300 may further include a data store 308, which can be any suitable combination of hardware and/or software, that provides for mass storage of information, databases, and programs employed in connection with aspects described herein. For example, data store 308 may be a data repository for applications not currently being executed by processor 302.

Computing device 300 may additionally include a user interface component 310 operable to receive inputs from a user of computing device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof.

Computing device 300 may also include one or more searchable schema plug-in modules 206. For example, the one or more plug-in modules 206 may be stored in memory 304. Each schema plug-in module 206 may be configured to generate searchable service descriptions 208 (FIG. 2) from service descriptions written in any service description language 204 based on a normalized schema 209. The searchable service description 208 is published to the network, and is used to process queries for service. Generating the searchable service description 208 includes extracting keywords from the service description in its native form, and then advertising these keywords in the format of the searchable service description 208 on the network.

Computing device 300 may further comprise a query receiving module 320 configured to receive user queries. The query receiving module 320 may be further configured to determine which one or more nodes in the network is responsible for the particular keywords forming the query. As described above, a network may implement a partition-by-keyword approach, wherein a term-frequency table is split by rows and each row or set of rows is assigned to a particular node randomly. Accordingly, query receiving module 320 may be configured to determine the one or more nodes responsible for the query keywords based on the term-frequency table. A hash function may be implemented to determine the responsible node(s). Query receiving module 320 may be further configured to route the query to the appropriate node(s) for processing. For example, in some instances, the query receiving module 320 may be configured to select a first node for forwarding the query to, wherein the first node is responsible for a first keyword in the query. The query receiving module 320 may also be configured to receive the results of the search from the other nodes in the network, and to forward the results back to the user.

Computing device 300 may further comprise a query processing module 330 configured to process queries for data and/or documents stored on the network. Query processing module 330 may comprise a keyword set determination sub-module 332 configured to determine the set of documents matching the keyword query for those keywords that the node is responsible for.

Query processing module 330 may further comprise a Bloom filter calculation sub-module 334. The Bloom filter calculation sub-module may be configured to determine an optimally sized Bloom filter for representing the set of documents determined by keyword set determination sub-module 332. The length of the Bloom filter, for example, may be determined as a function of the number of documents in the set. A Bloom filter is a space-efficient probabilistic data structure that is used to test whether an element is a member of a set. A plurality of hash functions may be defined for the Bloom filter, each of which maps or hashes some set element to one of the L array positions with a uniform random distribution. To query for an element or test if it is present in the set, the element is provided as an input to the hash function to get array positions. If any of the bits of these positions are 0, the element is not in the set; otherwise, if all are 1, then either the element is in the set or the bits have been set to 1 during the insertion of other elements.

One advantage of using a Bloom filter is that it provides a large amount of compression. However, as a result, false positives may occur. That is, the Bloom filter may indicate that an element is part of a set when it is not. This can happen, for example, when all the locations corresponding to the element are already set to 1 during the insertion of other elements. Accordingly, Bloom filter calculation sub-module 334 may be configured to correct for false positives.

Query processing module 330 may also include multiple-keyword processing module 336 configured to process multiple keyword queries, such as AND queries and OR queries. An AND query seeks to determine a set of documents wherein each document in the set includes each and every keyword forming part of the query. An OR query seeks to determine a set of documents wherein each document in the set includes at least one keyword specified in the query. Multiple-keyword processing module 336 may work with Bloom filter calculation sub-module 334 to compute the intersection of received sets of documents from two or more nodes in a network.

Figure 4:
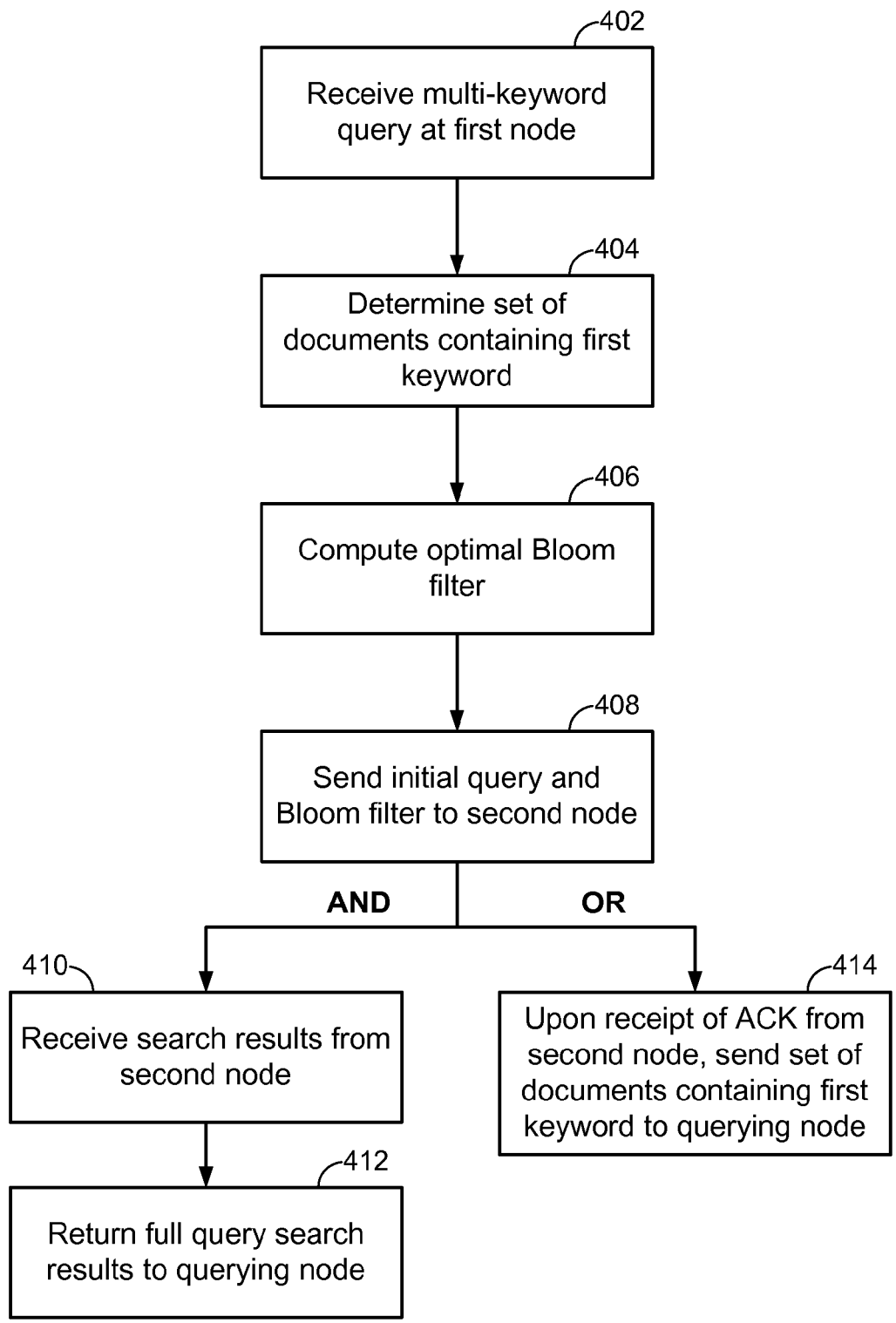
FIG. 4 is a flowchart of an aspect of a method of performing a multiple keyword search.

FIG. 4 is a flowchart depicting an exemplary method for processing a received multiple keyword query. As depicted at 402, a first node may receive a query comprising multiple keywords. The query may be, for example, an AND query, and OR query, or a combined AND/OR query. The query may be received from another node (the querying node) in the network that has determined that the receiving node is responsible for a first keyword in the query.

As depicted at 404, the first node determines the set of documents containing a first keyword specified in the query. The first node may determine the appropriate documents by scanning its memory for the query word and extracting the corresponding row of the term-frequency table it has stored internally in its memory. The node then finds the set of documents which have a non-zero entry in the chosen row.

As depicted at 406, the first node may compute an optimal Bloom filter to represent the set of documents containing the query keyword. This may include, for example, computing the size of the Bloom filter required for the search process based on the size of the set of documents containing the keyword. The node may then hash the document identifiers for each document in the set of documents onto the Bloom filter. As depicted at 408, the first node then sends the initial query along with the calculated Bloom filter and its coefficients to a second node that is responsible for a second keyword in the initial query. In some implementations, the first node may be configured to determine the node responsible for the second keyword. In other implementations, the node responsible for the second (and any subsequent) keywords may be predetermined by the querying node.

As depicted at 410, if the query is an AND query, the first node may receive the search results from the second node. The first node may verify the search results, for example, by examining the set of documents returned by the second nodes for false positives. That is, the first node may examine the set of documents returned by the second nodes to see if the set contains any documents that do not contain the first keyword. Any such false positives may be removed by the first node. As depicted at 412, the first node may return the search results to the querying node. If the query is an OR query, the first node may, upon receipt of an acknowledgment message from the second node, send the list of documents matching the first keyword to the querying node, as depicted at 414

Figure 5A:
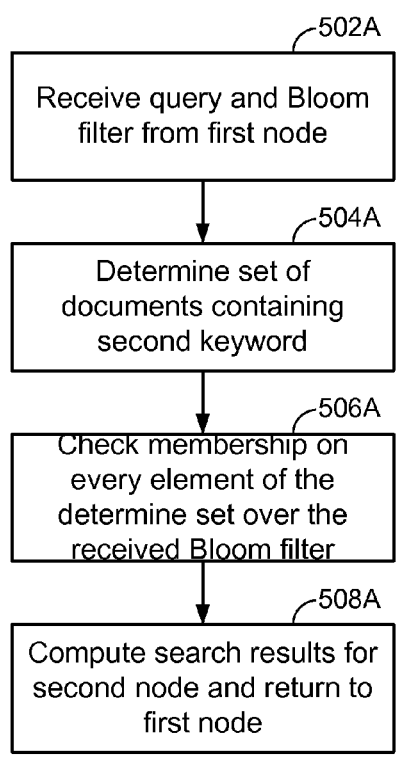
FIGS. 5A and 5B are flowcharts of additional aspects of a method of performing a multiple keyword search.

The method performed by a second node receiving a query and Bloom filter from a first node, as described above with respect to FIG. 4, may differ depending upon whether the search is an AND search or an OR search. FIG. 5A depicts a method that may be implemented by a second node to perform an AND search. As shown in FIG. 4, step 408, after the first node has computed its Bloom filter, the first node sends the initial query and its calculated Bloom filter to a second node responsible for a second keyword in the query. As depicted at 502A, the second node receives the query and the Bloom filter from the first node. The second node then determines the set of documents matching the second keyword, as depicted at 504A. Determining the set of documents may be performed as described above with respect to the first keyword. The second node then checks membership on every element of the determined set of documents matching the second keyword over the Bloom filter calculated by the first node, as depicted at 506A. The second node then computes its search results by calculating the intersection $D2 \cap BF(D1)$, wherein D2 represents the second set of documents and BF(D1) represents the Bloom filter of the first set of documents, and returns the search results back to the first node, as depicted at 508A. The first node may then, as depicted in FIG. 4, step 412, send the list of documents to the querying node.

Figure 5B:
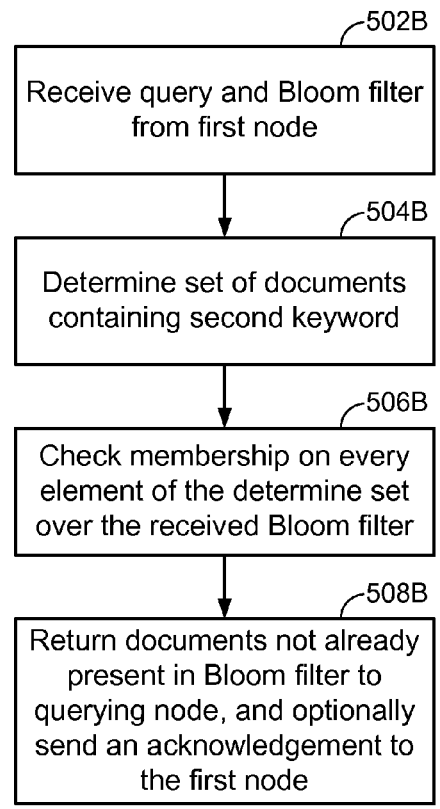

FIG. 5B depicts a process that may be implemented by a second node for performing an OR search. Steps 502B, 504B, and 506B are the same as steps 502A, 504A, and 506A, wherein the second node receives the query and the Bloom filter from the first node, determines the set of documents matching the second keyword, and then checks membership on every element of the determined set of documents matching the second keyword over the Bloom filter calculated by the first node. As depicted at 508B, the second node returns those documents that are not already present in the Bloom filter of the first node to the querying node. The second node may also send an ACK response to the first node. The querying node may then take the union of the received set D2-BF (D1), obtained from the second node (wherein D2 is the second set of documents and BF(D1) is the Bloom filter of the first set of documents), and the first set of documents obtained from the first node to complete the search process.

For AND searches, the communication cost and probability of false positives can be reduced by appropriate choice of the Bloom filter length ($L_s$) and the number of hash functions ($r_s$). $L_s$ and $r_s$ may be computer using the following formulas:

$$L_s = \left(\frac{|D1|}{(\ln 2)^2}\right) * \ln(b(\ln 2)^2) \quad (1)$$

$$r_s = \left(\frac{L_s}{|D1|}\right) * \ln 2 \quad (2)$$

The methods described herein can be extend for AND queries involving more than two keyword terms. For example, when the user issues a query in the form "k1 and k2 and k3 and . . . kq", the following steps are performed:

(1) Query is sent to the node: n1=hash(k1).
(2) Node-n1 looks at its local inverted index list and finds the set of documents, D1, that contain the keyword-k1. n1 computes the size of Bloom filter and the value of r using (3) and (4), respectively, with the size of the set-D1 as input.
(3) Node-n1 adds all document IDs in D1 onto the Bloom filter and sends the filter coefficients to node n2=hash (k2).
(4) On receiving the query from n1, the node n2 looks at its local inverted index to find the list of documents, D2, that contain the keyword-k2. n2 checks membership on every element of D2 over the Bloom filter-BF(D1) and computes the intersection D2∩BF(D1).
(5) n2 computes the size of Bloom filter with the size of the set-D2∩BF(D1) as input as in $$L_s = \left(\frac{|D2 \cap BF(D1)|}{(\ln 2)^2}\right) * \ln(b(\ln 2)^2) \quad (3)$$

The value of $r_s$ is computed as in $$r_s = \left(\frac{L_s}{|D1|}\right) * \ln 2 \quad (4)$$

with the new value of $L_s$. n2 sends the filter coefficients to node n3=hash(k3).

(6) Steps (5) and (6) are repeated for all the q keywords in the query. In each step, a new value of $L_s$ is computed using (9) and the value of $r_s$ is updated.
(7) The node nq=hash(kq) then returns the list of IDs back to previous node $n_{q-1}$=hash($k_{g-1}$).
(8) The node-$n_{q-1}$ performs intersection of the received set and the set $D_{q-1}$ that it owns, and returns the resulting list of documents to $n_{q-2}$=hash($k_{q-2}$).
(9) Steps (7) and (8) are repeated until the final response reaches n1=hash(k1).
(10) The node-n1 performs intersection of the received set and the set D1, and returns the resulting list of documents to the source.

Prior knowledge about the size of |Dj| (1≤j≤q) can be used to further reduce communication cost. The query can be sent first to the node ĵ=arg min{Dj|} and then routed to the node j' which has the second smallest value for |Dj| and so on. In this way, the amount of communicated data can be significantly reduced. Caching techniques can be employed to get an estimate of the sizes of |Dj| apriori and these estimates can be used to determine the size of the Bloom filter.

In an OR search, the length of the filter, $L_s$, and the number of hash functions, $r_s$, can be obtained by solving a constrained optimization problem aimed at maximizing the savings due to Bloom Filters while maintaining recall above a desired value.

$$L_s = \frac{|D1|}{(\ln 2)^2} \times \ln\left(\frac{1}{2} \cdot \frac{1}{1 - R_{des}}\right) \quad (5)$$

$$r_s = \log_2\left(\frac{1}{2} \cdot \frac{1}{1 - R_{des}}\right) \quad (6)$$

The methods described herein for performing an OR search can be extended for OR queries involving more than two keyword terms. For example, when a user issues a query of the form "k1 or k2 or k3 or . . . kq", the following steps are performed:

(1) Query is sent to the node: n1=hash(k1).
(2) Node-n1 looks at its local inverted index list and finds the set of documents, D1, that contain the keyword-k1. n1 computes the size of Bloom filter and the value of r using (15) and (16), respectively, with the size of the set-D1 as input.
(3) Node-n1 adds all document IDs in D1 onto the Bloom filter and sends the filter coefficients to node n2=hash (k2). Node-n1 sends D1 to the querying node.
(4) On receiving the Bloom filter and query from n1, the node n2 looks at its local inverted index to find the list of documents, D2, that contain the keyword-k2 and not included in the Bloom filter sent by n1. n2 sends these additional document IDs to the querying node and sends an acknowledgment to n1 for the received data.
(5) n2 adds these additional document IDs (D2−BF(D1)) to BF(D1). The combined Bloom filter is referred to as BF(D1, D2); note that this might be different from BF(D1∪D2) because some IDs in D2 may be omitted in Step (4) due to possible collisions in the Bloom filter. n2 sends the filter coefficients, BF(D1, D2), to node n3=hash(k3).
(6) Steps (4) and (5) are repeated for all the q keywords in the query. When the query is at the ith node-ni=hash(ki), the node-ni sends the document IDs left out in BF(D1, D2, . . . , $D_{i-1}$) to the querying node and sends the updated Bloom filter, BF(D1, D2, . . . , $D_i$) to node-$n_{i+1}$=hash($k_{i+1}$).

(7) The querying node takes a union of all document IDs received from q-nodes to complete the search.

Prior knowledge about the size of $|D_j|$ ($1 \leq j \leq q$) can be used to further reduce communication cost. The query can be sent first to the node $\hat{j} = \arg\max\{\|D_j\|\}$ and then routed to the node j' which has the second largest value for $|D_j|$ and so on. Further, Bloom Filters help provide large savings only when $|D_1|$ and/or $|D_j|$ is small (see figure in Appendix B). For large values of $|D_1|$ and/or $|D_2|$, transmitting the actual sets (instead of the Bloom filters) is recommended. In particular, it is recommended to use the Bloom filter approach when $$\frac{|D_2|b - L_s - (1 - (1 - e^{-|D_1|r_s/L_s})^{r_s}) * (|D_2| - |D_1 \cap D_2|)b}{(|D_1| + |D_2|)b} > \eta \quad (7)$$

and the direct transmission approach otherwise. This choice among the two contrasting approaches can be made by node-n1 in Step (2) using its values of $|D_1|$ and the cached values of $|D_2|$.

Bloom filters can be used to produce incremental results for both AND and OR type searches. Users issuing a query rarely need all the results when they search for a service. By using streaming transfers and returning only the desired number of results, the amount of information that needs to be sent can be reduced. As can be seen in Appendix A and Appendix B, the communication cost for a query is directly proportional to the size of the sets $|D_1|$ and/or $|D_2|$, and greater the number of documents that contain the term, the higher the communication cost.

Bloom filters can help reduce the communication cost by allowing incremental researches. When the user searches for a fixed number of results with a query "k1 and k2", the corresponding nodes n1 and n2 can communicate incrementally until that number is reached. The node n1 sends its Bloom filter in chunks and the node n2 returns only the set of results for that corresponding Bloom filter chunk. Because a single Bloom filter cannot be divided and still retain any meaning, the document set D1 needs to be partitioned into sets; the Bloom filter length can then be designed targeting the chunk-size. This process can be repeated until the node-n1 identifies a fixed number of results for the query. A similar incremental approach can also be performed for OR search.

For other types of queries that are a combination of AND and OR searches, for example Q=(Q1∪Q2)∩(Q3∪Q4), etc., a multi-step procedure may be implemented. In the first step, the query is simplified and expressed as a sum-of-products using, for example, Karnaugh maps or Quine-McCluskey algorithm. In the example above, the query Q is expressed as Q=(Q1∩Q3)∪(Q1∩Q4)∪(Q2∩Q3)∪(Q2∩Q4).

In the second step, the querying node, $n_Q$, parses the query and breaks the query into a series of AND queries. In this example, the querying node would break the query Q into four queries, namely, 1. (Q1∩Q3);
2. (Q1∩Q4);
3. (Q2∩Q3); and
4. (Q2∩Q4).

These four queries may be separately executed as individual AND searches and the individual results are collected. In the final step, the querying node performs the union of these individual results to obtain the final answer to the search query.

Figure 6:
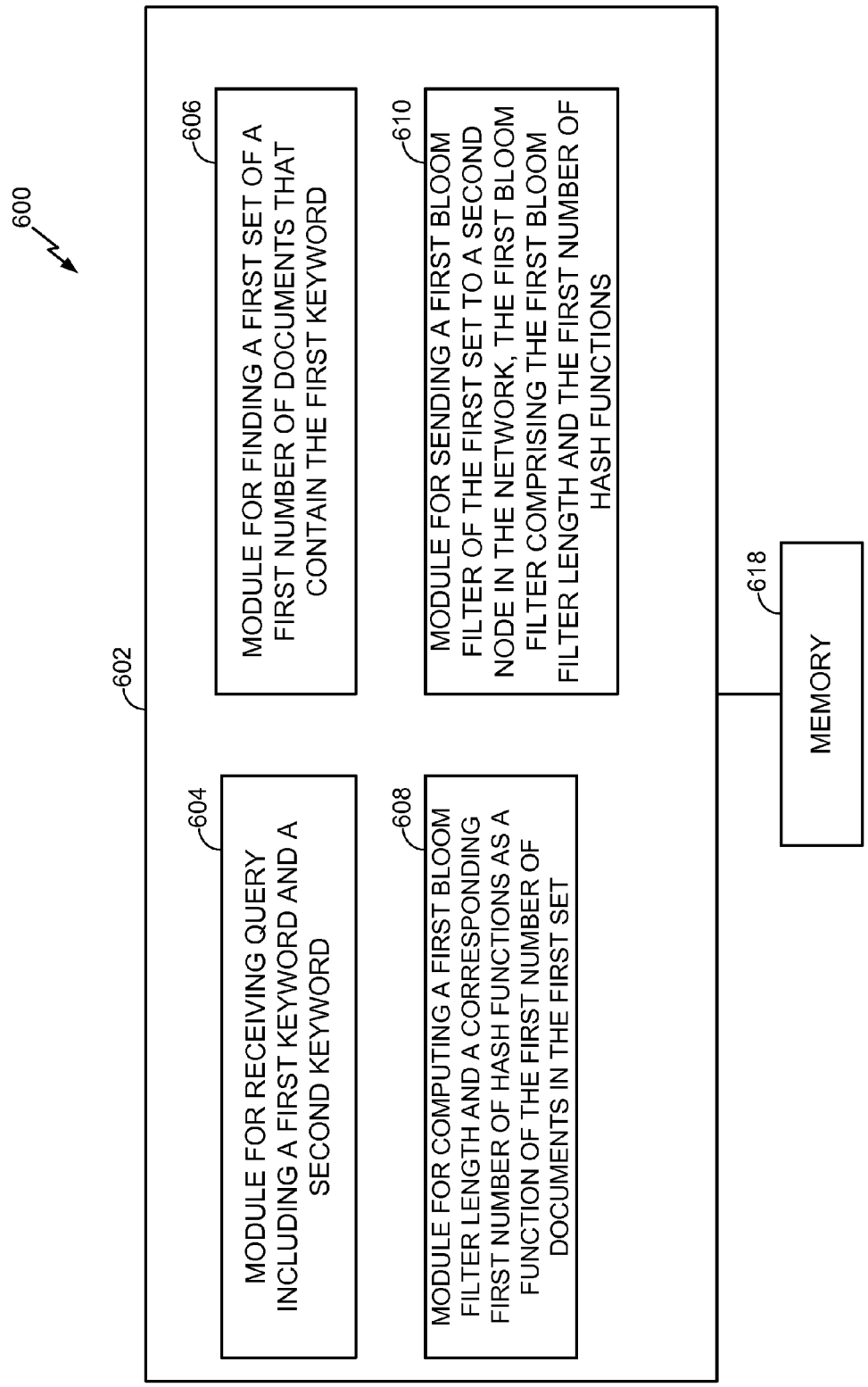
FIG. 6 is a schematic diagram of an aspect of a system for performing a multiple keyword search

Turning to FIG. 6, illustrated is a system 600 for publishing and discovering services in a network. As depicted, system 600 includes functional blocks that can represent functions implemented by a processor, software, or combination thereof (e.g., firmware). System 600 includes a logical grouping 602 of electrical components that act in conjunction. System 600 may be implemented, for example, by a computing device acting as a node in a distributed network.

Logical grouping 602 can include a module for receiving a query including a first keyword and a second keyword 604. Moreover, logical grouping 602 can include a module for finding a first set of a first number of documents that contain the first keyword 606. Logical grouping 602 may further include a module for computing an optimal first Bloom filter length and a corresponding first number of hash functions as a function of the first number of documents in the first set 608; and a module for sending a first Bloom filter of the first set to a second node in the distributed network identified by hashing the second keyword, wherein the first Bloom filter comprises the first Bloom filter length and the first number of hash functions 610. Additionally, system 600 can include a memory 618 that retains instructions for executing functions associated with electrical components 604-610. While shown as being external to memory 618, it is to be understood that electrical components 604-610 can exist within memory 618.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an"

as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

APPENDIX A

Deriving Bloom Filter Parameters for AND Search

In this Appendix, derivations to obtain the parameters of Bloom filters for AND search are presented. Without loss of generality, a two-keyword query of the form "k1 and k2" is considered. Let the nodes that own these keywords be denoted as n1 and n2 where n1=hash(k1) and n2=hash(k2). Further, D1 and D2 here denote the set of documents that contain keywords k1 and k2, respectively.

The total communication cost in the presence of Bloom Filters can be shown to be:

$$C_b = L + P_c|D2|b + 2|D1 \cap D2|b \quad (A1)$$

Where $P_c$ is the probability of collusion in the Bloom Filter. Substituting for $P_c$ from (1) into the equation, $$C_b = L + (1-e^{-|D1|r/L})^r |D2|b + 2|D1 \cap D2|b \quad (A2)$$

As can be seen from this equation, the total amount of communication cost is a function of L and r and can be minimized by appropriate choice of these parameters.

Setting $$\frac{\partial C_b}{\partial L} = 0 \text{ and } \frac{\partial C_b}{\partial r} = 0:$$

$$\hat{L} = \left(\frac{|D1|}{(\ln 2)^2}\right) * \ln\left(\frac{|D2|b}{|D1|}(\ln 2)^2\right) \quad (A3)$$

$$\hat{r} = \left(\frac{\hat{L}}{|D1|}\right) * \ln 2 \quad (A4)$$

Most often, the node n1 has information only about the set D1 and has no information about the set D2. Therefore, it would not be able to compute the optimal values of L and r using the above two equations as these expressions also involve D2. It is proposed to compute the values under the assumption that $|D2|=|D1|$. The sub-optimal values of L and r, denoted as $L_s$ and $r_s$, can be shown to be:

$$L_s\left(\frac{|D1|}{(\ln 2)^2}\right) * \ln(b(\ln 2)^2) \quad (A5)$$

$$r_s = \left(\frac{L_s}{|D1|}\right) * \ln 2 \quad (A6)$$

Figure 7:
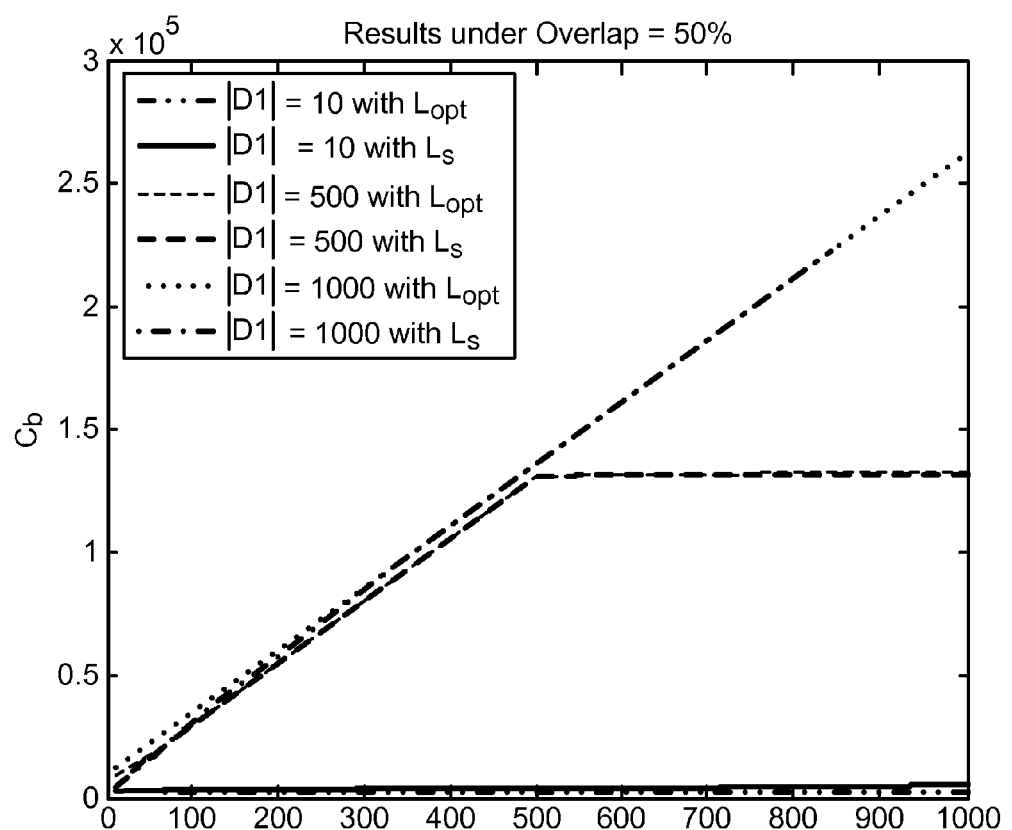
FIG. 7 illustrates additional aspects of disclosed examples.

FIG. 7 shows the communication cost as a function of the size of D2 for different values of |D1|. The results in FIG. 7 are under 50% overlap wherein 50% overlap is defined as the point at which the size of the intersection: $|D1 \cap D2|=(50/100) \times \min\{|D1|, |D2|\}$. Two main conclusions may be drawn from FIG. 7. Firstly, FIG. 7 shows that the communication cost increases as |D1| and |D2| increase. This result is expected because the size of |D1∩D2| increases as |D1| and |D2| increase and therefore more document IDs are returned to the user. Secondly, the results in FIG. 7 suggest that there is not much difference in terms of communication cost when the sub-optimal value $L_s$ is used instead of $\hat{L}=L_{opt}$; this implies that node n1 can use the value of |D1| as a reasonable estimate for computing the size of the filter.

APPENDIX B

Deriving Bloom Filter Parameters for OR Search

In this Appendix, derivations to obtain the parameters of Bloom filters for OR search are presented. Without loss of generality, a two-keyword query of the form "k1 or k2" is presented. Let the nodes that own these keywords be denoted as n1 and n2 where n1=hash(k1) and n2=hash(k2). Further, D1 and D2 are used to denote the set of documents that contain keywords k1 and k2, respectively.

In order to study the performance of the search algorithm and understand tradeoffs, it is mathematically determined, the savings and recall-rate. With the Bloom filter, the total communication cost can be shown to be:

$$C_b = L + |D1|b + (D1 - P_c)*(|D2| - |D1 \cap D2|)b \quad (B1)$$

where $P_c$ is the probability of collusion in the Bloom Filter as in (1). The amount of savings, $S_b$, is therefore $$S_b = |D2|b - L - (1 - (1-e^{-|D1|r/L})^r)*(|D2| - |D1 \cap D2|)b \quad (B2)$$

The cost paid while using Bloom filters is in terms of the recall rate, $R_b$, which can be shown to be:

$$R_b = 1 - (1 - e^{-|D1|r/L})^r * \frac{|D2| - |D1 \cap D2|}{|D1 \cup D2|} \quad (B3)$$

Optimal values for the length of the filter, L, and the number of hash functions, r, can be obtained by solving a constrained optimization problem aimed at maximizing $S_b$ under the constraint that $R_b \geq R_{des}$, where $R_{des}$ denotes the designed recall-rate. Defining the cost function $T_b = S_b + \lambda(R_b - R_{des})$, the optimal values of L and r can be computed by setting $$\frac{\partial T_b}{\partial L} = 0 \text{ and } \frac{\partial T_b}{\partial r} = 0.$$

$$\hat{L} = \frac{|D1|}{(\ln 2)^2} \times \ln\left(\frac{|D1| - |D1 \cap D2|}{|D1 \cup D2|} \cdot \frac{1}{1 - R_{des}}\right) \quad (B4)$$

$$\hat{r} = \left(\frac{\hat{L}}{|D1|}\right) \times \ln 2 \quad (B5)$$

Since the value of |D2| is not known apriori at node-n1, a sub-optimal solution is obtained by solving (13) and (14) under the assumption of $|D2|=|D1|$ and $D1 \cap D2 = \phi$. This gives $$L_s = \frac{|D1|}{(\ln 2)^2} \times \ln\left(\frac{1}{2} \cdot \frac{1}{1 - R_{des}}\right) \quad (B6)$$

$$r_s = \log_2\left(\frac{1}{2} \cdot \frac{1}{1 - R_{des}}\right) \quad (B7)$$

Figure 8:
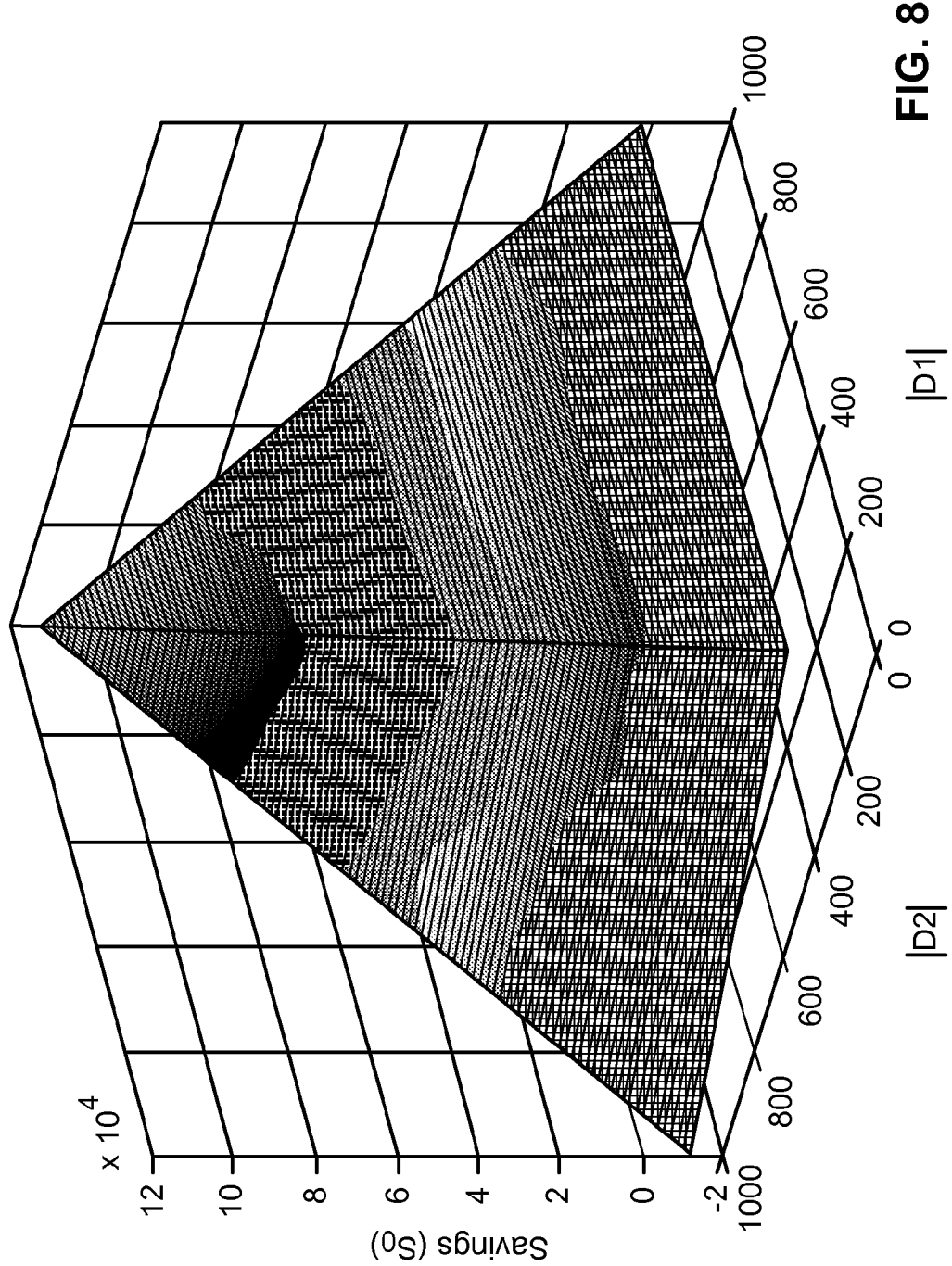
FIG. 8 illustrates yet additional aspects of disclosed examples.

FIG. 8 below shows the communication cost as a function of |D1| and |D2|. The results in FIG. 8 are for $R_{des} = 1-(\frac{1}{2})^9$ under 50% overlap wherein 50% overlap is defined as before. FIG. 8 shows that the savings are large when |D1| and |D2| are small and reduce even below zero when either set sizes are large.

What is claimed is:

1. A method of searching in an overlay network, comprising:
   receiving a query at a first node in a distributed network from a querying node, wherein the query includes a first keyword and a second keyword;
   finding a first set of a first number of documents that contain the first keyword;
   computing an optimal first Bloom filter length and a corresponding first number of hash functions as a function of the first number of documents in the first set;

determining a second node responsible for finding a set of documents that contain the second keyword based on a hashed second keyword;

generating a Bloom filter of the first set comprising an array having the first Bloom filter length and the first number of hash functions;

sending the first Bloom filter of the first set to the second node in the distributed network to generate a result for the searching;

returning, by the first node, documents consisting of the first set of documents to the querying node;

finding, at the second node, a second set of a second number of documents that contain the second keyword;

checking, at the second node, a membership of each of the documents in the second set over the first Bloom filter to determine a third set of documents that contain the second keyword and are not already present in the first Bloom filter; and returning, by second node, documents consisting of the third set of documents to the querying node.

2. The method of claim 1, wherein the query comprises an AND query.

3. The method of claim 2, wherein computing the first Bloom filter length, $L_s$, for the first set, D1, having keywords of maximum length b, further comprises computing according to the following equation:

$$L_s = \left(\frac{|D1|}{(\ln 2)^2}\right) * \ln(b(\ln 2)^2).$$

and wherein computing first number of hash functions, $r_s$, for the first set, D1, further comprises computing according to the following equation:

$$r_s = \left(\frac{L_s}{|D1|}\right) * \ln 2.$$

4. The method of claim 1, wherein the query comprises a combination of an AND and an OR query.

5. The method of claim 1, wherein computing the first Bloom filter length, $L_s$, for the first set, D1, further comprises computing according to the following equation:

$$L_s = \frac{|D1|}{(\ln 2)^2} \times \ln\left(\frac{1}{2} \cdot \frac{1}{1 - R_{des}}\right)$$

and wherein computing first number of hash functions, $r_s$, for the first set, D1, further comprises computing according to the following equation:

$$r_s = \log_2\left(\frac{1}{2} \cdot \frac{1}{1 - R_{des}}\right)$$

wherein $R_{des}$ is a desired recall rate of the Bloom filter.

6. The method of claim 1, further comprising using prior knowledge about a size of a respective set, |Dj|, to further reduce communication cost, where 1≤j≤q, and where q represents all keywords in the query.

7. The method of claim 6, further comprising sending the query to a node ĵ=arg min{|Dj|} and then to a next node which has a second smallest value for |Dj| to optimally perform an AND query.

8. The method of claim 6, further comprising sending the query first to a node ĵ=arg max{|Dj|} and then to a next node which has a second largest value for |Dj| to optimally perform an OR query.

9. The method of claim 6, further comprising using caching techniques to determine actual or approximate sizes of the sets |Dj| to determine where to forward queries.

10. The method of claim 1, further comprising determining a condition for using or not using first the Bloom filter for processing queries, wherein the condition comprises when a size of each set, |Dj|, are known apriori, where 1≤j≤q, and where q represents all keywords in the query.

11. The method of claim 10, further performing the computing for the first Bloom filter and using the first Bloom filter for an OR query only when:

$$\frac{|D2|b - L_s - (1 - (1 - e^{-|D1|r_s/L_s})^{r_s}) * (|D2| - |D1 \cap D2|)b}{(|D1| + |D2|)b} > \eta$$

wherein the keywords have a maximum length b and $\eta$ is a threshold.

12. A computer system configured to publish or discover services in a network, comprising:

a first computer device is programmed to:
receive a query at a first network node in a distributed network from a querying node, wherein the query includes a first keyword and a second keyword;

find a first set of a first number of documents that contain the first keyword by searching a term-frequency table in a memory for the first set of documents having a non-zero entry for a row corresponding to the first keyword;

compute an optimal first Bloom filter length and a corresponding first number of hash functions as a function of the first number of documents in the first set;

determine a second network node responsible for finding a second set of documents that contain the second keyword based on a hashed second keyword;

generate a Bloom filter of the first set comprising an array having the first Bloom filter length and the first number of hash functions;

send the first Bloom filter of the first set to the second network node in the distributed network to publish or discover services corresponding to the second set of documents in the network; and return documents consisting of the first set of documents to the querying node; and a second computer device programmed to:
find, at the second node, a second set of a second number of documents that contain the second keyword;

check, at the second node, a membership of each of the documents in the second set over the first Bloom filter to determine a third set of documents that contain the second keyword and are not already present in the first Bloom filter; and return documents consisting of the third set of documents to the querying node.

13. The at least one processor of claim 12, wherein the query comprises an AND query, and wherein the third module for computing is further configured to compute the first Bloom filter length, $L_s$, for the first set, D1, having a maximum keyword length of b, according to the following equation:

$$L_s = \left(\frac{|D1|}{(\ln 2)^2}\right) * \ln(b(\ln 2)^2).$$

14. The at least one processor of claim 12, wherein the query comprises an OR query, and wherein the third module for computing is further configured to compute the first Bloom filter length, $L_s$, for the first set, D1, according to the following equation:

$$L_s = \frac{|D1|}{(\ln 2)^2} \times \ln\left(\frac{1}{2} \cdot \frac{1}{1-R_{des}}\right)$$

wherein $R_{des}$ is a desired recall rate of the Bloom filter.

15. The at least one processor of claim 12, wherein the at least one processor further comprises a fifth module for determining a condition for using or not using the first the Bloom filter for processing queries, wherein the condition comprises when a size of each set, |Dj|, are known apriori, where $1 \leq j \leq q$, and where q represents all keywords in the query, and wherein the third module for computing is further configured to compute the first Bloom filter for an OR query only when:

$$\frac{|D2|b - L_s - (1 - (1 - e^{-|D1|r_s/L_s})^{r_s}) * (|D2| - |D1 \cap D2|)b}{(|D1| + |D2|)b} > \eta$$

wherein the keywords have a maximum length b and $\eta$ is a threshold.

16. A computer program product, comprising:
a non-transitory computer-readable medium comprising:
a first set of codes for causing a computer to receive a query at a first node in a distributed network from a querying node, wherein the query includes a first keyword and a second keyword;
a second set of codes for causing the computer to find a first set of a first number of documents that contain the first keyword;
a third set of codes for causing the computer to compute an optimal first Bloom filter length and a corresponding first number of hash functions as a function of the first number of documents in the first set; and
a fourth set of codes for causing the computer to send a first Bloom filter of the first set to a second node in the distributed network, wherein the second node is identified based on a hashed second keyword, wherein the second node is responsible for finding a set of documents that contain the second keyword, and wherein the first Bloom filter comprises an array having the first Bloom filter length and the first number of hash functions;
a fifth set of codes for causing the computer to return documents consisting of the first set of documents to the querying node;
a sixth set of codes for causing a second computer to find, at the second node, a second set of a second number of documents that contain the second keyword;
a seventh set of codes for causing the second computer to check, at the second node, a membership of each of the documents in the second set over the first Bloom filter to determine a third set of documents that contain the second keyword and are not already present in the first Bloom filter; and
a eighth set of codes for causing the second computer to return documents consisting of the third set of documents to the querying node.

17. The computer program product of claim 16, wherein the query comprises an AND query, and wherein the third set of codes is further configured to compute the first Bloom filter length, $L_s$, for the first set, D1, having a maximum keyword length of b, according to the following equation:

$$L_s = \left(\frac{|D1|}{(\ln 2)^2}\right) * \ln(b(\ln 2)^2).$$

18. The computer program product of claim 16, wherein the query comprises an OR query, and wherein the third set of codes is further configured to compute the first Bloom filter length, $L_s$, for the first set, D1, according to the following equation:

$$L_s = \frac{|D1|}{(\ln 2)^2} \times \ln\left(\frac{1}{2} \cdot \frac{1}{1-R_{des}}\right)$$

wherein $R_{des}$ is a desired recall rate of the Bloom filter.

19. The computer program product of claim 16, wherein the non-transitory computer-readable medium further comprises a fifth set of codes for determining a condition for using or not using the first the Bloom filter for processing queries, wherein the condition comprises when a size of each set, |Dj|, are known apriori, where $1 \leq j \leq q$, and where q represents all keywords in the query, and wherein the third set of codes is further configured to compute the first Bloom filter for an OR query only when:

$$\frac{|D2|b - L_s - (1 - (1 - e^{-|D1|r_s/L_s})^{r_s}) * (|D2| - |D1 \cap D2|)b}{(|D1| + |D2|)b} > \eta$$

wherein the keywords have a maximum length b and $\eta$ is a threshold.

20. An apparatus, comprising:
a first computing device providing a first node, the first computing device including:
means for receiving a query at a first node in a distributed network from a querying node, wherein the query includes a first keyword and a second keyword;
means for finding a first set of a first number of documents that contain the first keyword;
means for computing an optimal first Bloom filter length and a corresponding first number of hash functions as a function of the first number of documents in the first set;
means for sending a first Bloom filter of the first set to a second node in the distributed network, wherein the second node is identified based on a hashed second keyword, wherein the second node is responsible for finding a set of documents that contain the second keyword, and wherein the first Bloom filter comprises an array having the first Bloom filter length and the first number of hash functions; and
means for returning, by the first node, documents consisting of the first set of documents to the querying node; and
a second computing device providing the second node, the second computing device including:

means for finding, at the second node, a second set of a second number of documents that contain the second keyword;

means for checking, at the second node, a membership of each of the documents in the second set over the first Bloom filter to determine a third set of documents that contain the second keyword and are not already present in the first Bloom filter; and means for returning documents consisting of the third set of documents to the querying node.

21. The apparatus of claim 20, wherein the query comprises an AND query, and wherein the means for computing are further configured to compute the first Bloom filter length, $L_s$, for the first set, D1, having a maximum keyword length of b, according to the following equation:

$$L_s = \left(\frac{|D1|}{(\ln 2)^2}\right) * \ln(b(\ln 2)^2).$$

22. The apparatus of claim 20, wherein the query comprises an OR query, and wherein the means for computing are further configured to compute the first Bloom filter length, $L_s$, for the first set, D1, according to the following equation:

$$L_s = \frac{|D1|}{(\ln 2)^2} \times \ln\left(\frac{1}{2} \cdot \frac{1}{1 - R_{des}}\right)$$

wherein $R_{des}$ is a desired recall rate of the Bloom filter.

23. The apparatus of claim 20, further comprising means for determining a condition for using or not using the first the Bloom filter for processing queries, wherein the condition comprises when a size of each set, $|Dj|$, are known apriori, where $1 \leq j \leq q$, and where q represents all keywords in the query, and wherein the means for computing are further configured to compute the first Bloom filter for an OR query only when:

$$\frac{|D2|b - L_s - (1 - (1 - e^{-|D1|r_s/L_s})^{r_s}) * (|D2| - |D1 \cap D2|)b}{(|D1| + |D2|)b} > \eta$$

wherein the keywords have a maximum length b and $\eta$ is a threshold.

24. A system for performing multiple keyword searches in a distributed network, comprising:
a first computing device providing a first node, the first computing device including:
a receiver, comprising hardware, configured to receive a query including a first keyword and a second keyword from a querying node;
a first keyword set determination component configured to find a first set of a first number of documents that contain the first keyword;
a Bloom filter calculation component configured to compute an optimal first Bloom filter length and corresponding first number of hash functions as a function of the first number of documents in the first set, to send a first Bloom filter of the first set to a second node in the distributed network, wherein the second node is identified based on a hashed second keyword, wherein the second node is responsible for finding a set of documents that contain the second keyword,
and wherein the first Bloom filter comprises an array having the first Bloom filter length and the first number of hash functions; and
a first multiple-keyword processing component, at the first node, configured to return documents consisting of the first set of documents to the querying node
a second computing device providing the second node, the second computing device including:
a second keyword set determination component, at the second node, configured to find a second set of a second number of documents that contain the second keyword; and
a second multiple-keyword processing component, at the second node, configured to check a membership of each of the documents in the second set over the first Bloom filter to determine a third set of documents that contain the second keyword and are not already present in the first Bloom filter and return documents consisting of the third set of documents to the querying node.

25. The apparatus of claim 24, wherein the query is an AND query.

26. The apparatus of claim 25, wherein computing the first Bloom filter length, $L_s$, for the first set, D1, having a maximum keyword length of b, further comprises computing according to the following equation:

$$L_s = \left(\frac{|D1|}{(\ln 2)^2}\right) * \ln(b(\ln 2)^2)$$

and wherein computing first number of hash functions, $r_s$, for the first set, D1, further comprises computing according to the following equation:

$$r_s = \left(\frac{L_s}{|D1|}\right) * \ln 2.$$

27. The apparatus of claim 24, wherein the query comprises a combination of an AND and an OR query.

28. The apparatus of claim 24, wherein computing the first Bloom filter length, $L_s$, for the first set, D1, further comprises computing according to the following equation:

$$L_s = \frac{|D1|}{(\ln 2)^2} \times \ln\left(\frac{1}{2} \cdot \frac{1}{1 - R_{des}}\right)$$

and wherein computing first number of hash functions, $r_s$, for the first set, D1, further comprises computing according to the following equation:

$$r_s = \log_2\left(\frac{1}{2} \cdot \frac{1}{1 - R_{des}}\right)$$

wherein $R_{des}$ is a desired recall rate of the Bloom filter.

29. The apparatus of claim 24, wherein the Bloom filter calculation component is further configured to use prior knowledge about a size of a respective set, $|Dj|$, to further reduce communication cost.

30. The apparatus of claim 29, wherein the Bloom filter calculation component is further configured to send the query to a node ĵ=arg min{|Dj|} and then to a next node which has a second smallest value for |Dj| to optimally perform an AND query.

31. The apparatus of claim 29, wherein the Bloom filter calculation component is further configured to send the query first to a node ĵ=arg max{|Dj|} and then to a next node which has a second largest value for |Dj| to optimally perform an OR query.

32. The apparatus of claim 29, wherein the Bloom filter calculation component is further configured to use caching techniques to determine actual or approximate sizes of the sets |Dj| to determine where to forward queries.

33. The apparatus of claim 24, wherein the Bloom filter calculation component is further configured to determine a condition for using or not using the first the Bloom filter for processing queries, wherein the condition comprises when a size of each set, |Dj|, are known apriori.

34. The apparatus of claim 33, wherein the Bloom filter calculation component is further configured to perform the computing for the first Bloom filter and use the first Bloom filter for an OR query only when:

$$\frac{|D2|b - L_s - (1 - (1 - e^{-|D1|r_s/L_s})^{r_s}) * (|D2| - |D1 \cap D2|)b}{(|D1| + |D2|)b} > \eta$$

wherein the keywords have a maximum length b and $\eta$ is a threshold.

* * * * *